United States Patent [19]

Kao et al.

[11] Patent Number: 4,845,067

[45] Date of Patent: Jul. 4, 1989

[54] CATALYST FOR REGULATING THE MOLECULAR WEIGHT DISTRIBUTION OF ETHYLENE POLYMERS

[75] Inventors: Sun-Chueh Kao, Piscataway; Kevin J. Cann; Frederick J. Karol, both of Belle Mead, all of N.J.; Arthur E. Marcinkowsky, Charleston, W. Va.; Mark G. Goode, St. Albans, W. Va.; Eugene H. Theobald, Poca, W. Va.

[73] Assignee: Union Carbide Corporation, Danbury, Conn.

[21] Appl. No.: 214,587

[22] Filed: Jul. 1, 1988

[51] Int. Cl.$^4$ .................................................. C08F 4/68
[52] U.S. Cl. ..................................... 502/119; 502/112; 502/120; 502/123; 502/124; 502/125; 502/126; 502/127; 526/137
[58] Field of Search ............... 502/112, 119, 120, 123, 502/124, 125, 126, 127

[56] References Cited

U.S. PATENT DOCUMENTS

| | | | |
|---|---|---|---|
| 3,219,648 | 11/1965 | Hill | 502/124 X |
| 3,297,586 | 1/1967 | Duck et al. | 502/125 X |
| 3,477,999 | 11/1969 | Takeda et al. | 502/124 X |
| 3,647,772 | 3/1972 | Kashiwa | 502/123 |
| 3,786,032 | 1/1974 | Jennings et al. | 502/127 X |
| 4,224,182 | 9/1980 | Langer et al. | 502/127 X |
| 4,434,242 | 2/1984 | Roling et al. | 502/107 |
| 4,435,518 | 3/1984 | Pennington et al. | 502/107 |
| 4,508,842 | 4/1985 | Beran et al. | 502/112 |

Primary Examiner—Patrick P. Garvin
Attorney, Agent, or Firm—John S. Piscitello

[57] ABSTRACT

A vanadium-based catalyst is treated with certain oxygen-containing compounds as a means of narrowing and effectively regulating the molecular weight distribution of the polymers produced with the catalyst.

20 Claims, No Drawings

CATALYST FOR REGULATING THE MOLECULAR WEIGHT DISTRIBUTION OF ETHYLENE POLYMERS

FIELD OF THE INVENTION

This invention relates to a vanadium-based catalyst suitable for regulating the molecular weight distribution of ethylene polymers

BACKGROUND OF THE INVENTION

U.S. Patent 4,508,842 discloses a highly active vanadium-containing catalyst capable of producing ethylene polymers having a broad molecular weight distribution. Said catalyst comprises:
(A) a solid catalyst precursor consisting essentially of
  (1) an inorganic carrier, as support for
  (2) the reaction product of (a) a vanadium trihalide and (b) an electron donor, and
  (3) a boron halide or alkyl aluminum modifier,
(B) an alkylalum-inum cocatalyst, and
(C) a halohydrocarbon polymerization promoter.

The polymers produced in accordance with U.S. Pat. No. 4,508,842 have a relatively broad molecular weight distribution, and excellent extrudability. These properties render them extremely useful in a wide variety of applications, such as wire and cable insulation, blow molding, film, and pipe fabrication. However, such polymers cannot be used in other applications, such as injection molding, which require a narrower molecular weight distribution. U.S. Pat. No. 4,434,242, on the other hand, discloses vanadium containing catalyst compositions useful in the preparation of ethylene polymers a narrow molecular weight distribution. Such compositions are obtained by:
(1) drying an inorganic oxide having surface hydroxyl groups to form a support substantially free of adsorbed water,
(2) reacting the surface hydroxyl groups of the support with an organometallic compound,
(3) reacting the support treated in this manner with a tetravalent or pentavalent vanadium compound, and
(4) reacting the product of step (3) with an ether-alcohol.

While the catalyst compositions prepared in this manner have been found useful in the preparation of polymers having a narrow molecular weight distribution, the presence of ether-alcohols in such compositions has been found to adversely affect polymer productivity.

U.S. Pat. No. 4,435,518 discloses catalyst compositions similar to those of U.S. Pat. No. 4,434,242 except that the ether-alcohol of the latter patent is replaced with a monofunctional alcohol. Again, while such compositions are useful in the production of polymers having a narrow molecular weight distribution, the presence of alcohol in such compositions adversely affects polymer productivity.

The use of difunctional alcohols in place of monofunctional alcohols has been suggested in U.S. Pat. No. 4,435,519. However, such substitution has not been found to consistently narrow the molecular weight distribution of the polymers.

SUMMARY OF THE INVENTION

In accordance with the present invention, it has now been discovered that the molecular weight distribution of ethylene polymers produced employing a vanadium based catalyst system comprising:
(A) a solid catalyst precursor consisting essentially of
  (1) a solid, particulate, porous, inorganic carrier, as support for
  (2) the reaction product of
    (a) a vanadium trihalide and
    (b) an electron donor, and
  (3) a boron halide or alkyl-aluminum modifier,
(B) an alkylaluminum cocatalyst, and
(C) a halohydrocarbon polymerization promoter,
can be narrowed and effectively regulated within a wide range by treating catalyst component (A) with varying amounts of an oxygen containing compound selected from the group consisting of compounds having the formula:

A—R—B and R$^l$—B wherein:
R is a divalent hydrocarbon radical free of aliphatic unsaturation containing from 1 to 14 carbon atoms,
R$^1$ heterocyclic ring free of aliphatic unsaturation containing from 2 to 14 carbon atoms and at least one oxygen or nitrogen atom, and
A and B are each selected from the group consisting of:

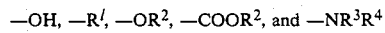
—OH, —R$^l$, —OR$^2$, —COOR$^2$, and —NR$^3$R$^4$ wherein:
R$^1$ is as defined above,
R$^2$ is a monovalent hydrocarbon radical free of aliphatic unsaturation containing from 1 to 14 carbon atoms, and
R$^3$ and R$^4$ are individually hydrogen or monovalent hydrocarbon radicals free of aliphatic unsaturation containing from 1 to 14 carbon atoms,
with the proviso that at least one of A and B must be —OH or —COOR$^2$, but both A and B cannot be —OH.

While catalyst component (A) may be treated with the oxygen containing compound by simply mixing the two in the polymerization reactor, it is preferred to pre treat catalyst component (A) with the oxygen-containing compound before it is added to the polymerization reactor.

Thus, the catalyst system of the present invention comprises:
(A) a solid catalyst precursor consisting essentially of
  (1) a solid, particulate, porous, inorganic carrier, as support for
  (2) the reaction product of (a) a vanadium trihalide and (b) an electron donor,
  (3) a boron halide or alkyl-aluminum modifier, and
  (4) an oxygen containing molecular weight distribution (MWD) regulator having the formula A—R—B or R$^l$—B, wherein A, R, B and R$^l$ are as defined above,
(B) an alkylaluminum cocatalyst, and
(C) a halohydrocarbon polymerization promoter.

DETAILED DESCRIPTION OF THE INVENTION

As a result of the present invention, it is now possible to effectively regulate the molecular weight distribution (MWD) of ethylene polymers produced by means of a vanadium containing catalyst system within a wide range by varying the amount of oxygen-containing compound A—R—B or R$^1$—B employed in the preparation of said catalyst system. Surprisingly, the catalyst systems containing these oxygen containing MWD regulators and particular cocatalysts have been found to be significantly more active than like untreated catalyst systems. As a result, it is possible to produce ethylene polymers by means of these catalyst systems having narrow-to intermediate molecular weight distributions at enhanced levels of catalyst activity and polymer productivity. By the effective use these oxygen-containing MWD regulators together with a suitable chain transfer agent, such as hydrogen, to control the molecular weight of the polymers, it is now possible, by means of this system, to tailor polymer properties for use in a wide variety of applications.

The polymers produced with the catalyst system of the present invention have a molecular weight distribution (MWD), defined as the ratio of weight average molecular weight to number average molecular weight ($M_w/M_n$), of less than 20 to as low as 4. Another means of indicating the molecular weight distribution of a polymer is by the melt flow ratio (MFR) of that polymer. By melt flow ratio is meant the flow index: melt index ratio of the polymer, wherein flow index and melt index are determined in accordance with ASTM D-1238, Conditions F and E, respectively. The polymers produced with the catalyst system of the present invention have a melt flow ratio of less than 120 to as low as 30. For these polymers, such MFR values correspond to the $M_w/M_n$ values set forth above.

The polymers produced with the catalyst system of the present invention have a melt index of from greater than 0 g/10 minutes to about 500 g/10 minutes, usually of from about 0.1 g/10 minutes to about 100 g/10 minutes The melt index of a polymer varies inversely with the molecular weight of the polymer, and is a function of the hydrogen/monomer ratio employed during preparation of the polymer.

As indicated above, both the molecular weight and the molecular weight distribution of the polymers can vary widely depending upon the amount of oxygen containing MWD regulator present in the catalyst system employed to produce such polymers and the amount of chain transfer agent present during polymerization. As a result, a broad variety of polymers having widely varying properties can be produced.

The polymers produced with the catalyst system of the present invention are also characterized by a density of from about 0.86 g/cm³ to about 0.96 g/cm³. Such polymers generally contain at least 50 mol percent of polymerized ethylene and no more than 50 mol percent of polymerized alpha olefin containing from 3 to 8 carbon atoms and, optionally, polymerized diene. When polymerized diene is present, the polymer ordinarily contains from 0.01 mol percent to 10 mol percent of at least one such diene, from 6 mol percent to 55 mol percent of at least one polymerized alpha olefin containing from 3 to 8 carbon atoms, and from 35 mol percent to 94 mol percent of polymerized ethylene. Catalyst component (A) consists essentially (1) a solid, particulate, porous, inorganic carrier, as support for (2) the reaction product of (a) a vanadium trihalide and (b) an electron donor, (3) a boron halide or alkylaluminum modifier, and (4) an oxygen-containing molecular weight distribution (MWD) regulator having the formula A—R—B or $R^1$—B, wherein A, R, B and $R^1$ are as defined above.

The vanadium trihalide which is reacted with the electron donor in the preparation of catalyst component (A) is preferable vanadium trichloride, although the halogen present in said vanadium trihalide may be chlorine, bromine or iodine, or any mixture thereof.

The electron donor employed is a liquid, organic Lewis base in which the vanadium trihalide is soluble.

Suitable electron donors include alkyl esters of aliphatic and aromatic carboxylic acids, aliphatic ketones, aliphatic amines, aliphatic alcohols, aliphatic ethers and cycloaliphatic ethers. Particularly useful are alkyl esters of aliphatic carboxylic acids containing from 1 to 4 carbon atoms; alkyl esters of aromatic carboxylic acids containing from 7 to 8 carbon atoms; aliphatic ketones containing from 3 to 6 carbon atoms, preferably from 3 to 4 carbon atoms; aliphatic amines containing from 1 to 14 carbon atoms, preferably from 2 to 8 carbon atoms; aliphatic alcohols containing from 1 to 8 carbon atoms, preferably from 2 to 8 carbon atoms; aliphatic ethers containing from 2 to 8 carbon atoms, preferably from 4 to 5 carbon atoms; and cycloaliphatic ethers containing from 4 to 5 carbon atoms, preferably mono- or di ethers containing 4 carbon atoms. The aliphatic and cycloaliphatic ethers are most preferred, particularly tetrahydrofuran. If desired, these electron donors may be substituted with one or more substituents which are inert under the reaction conditions employed during reaction with the vanadium trihalide, as well as during preparation of and polymerization with catalyst component (A). The modifier employed in the preparation of catalyst component (A) is a boron halide or alkylaluminum compound having the formula:

ti $MX_a$ wherein:

M is boron or $AlR^5_{(3-a)}$ wherein each R5 is an alkyl radical containing from 1 to 14 carbon atoms, which radicals may be the same or different, X is selected from the group consisting of fluorine, chlorine, bromine and iodine, and mixtures thereof, and a is an integer having a value of 0, 1 or 2, provided that a is 3 when M is boron.

Preferably any halide present in the modifier is chlorine, and any alkyl radicals present contain from 1 to 6 carbon atoms. Such alkyl radicals may be cyclic, branched or straight chain, and may be substituted with one or more substituents which are inert under the reaction conditions employed during preparation of and polymerization with catalyst component (A). Diethylaluminum chloride is preferred.

The oxygen-containing compound employed to treat catalyst component (A) so as to regulate the molecular weight distribution (MWD) of the polymers produced with the catalyst of the present invention is selected from compounds having the formulas:

, A—R—B and $R^1$—B wherein:

R is a divalent hydrocarbon radical free of aliphatic unsaturation containing from 1 to 14 carbon atoms, $R^1$ heterocyclic ring free of aliphatic unsaturation containing from 2 to 14 carbon atoms and at least one oxygen or nitrogen atom, and A and B are each selected from the group consisting of —OH, —R$^1$, —OR$^2$, COOR$^2$, and NR$^3$R$^4$ wherein:
R$^1$ is as defined above
R$^2$ is a monovalent hydrocarbon radical free of aliphatic unsaturation containing from 1 to 14 carbon atoms, and
R$^3$ and R$^4$ are individually hydrogen or monovalent hydrocarbon radicals free of aliphatic unsaturation containing from 1 to 14 carbon atoms,
with the proviso that at least one of A and B must be —OH or COOR$^2$, but both A and B cannot be —OH.

Usually R is an alkylene radical containing from 1 to 14 carbon atoms, or an arylene radical containing from 6 to 14 carbon atoms. Preferably R contains from 1 to 6 carbon atoms when it is alkylene and 6 carbon atoms when it is arylene.

R$^l$ is a heterocyclic ring which preferably contains from 2 to 6 carbon atoms and one oxygen or one nitrogen atom.

R$^2$, R$^3$ and R$^4$ are usually alkyl radicals containing from 1 to 14 carbon atoms, preferably from 1 to 6 carbon atoms, or aryl radicals containing from 6 to 14 carbon atoms, preferably 6 carbon atoms.

Any or all of R, R$^1$, R$^2$, R$^3$ and R$^4$ may be substituted with one or more substituents which are inert under the reaction conditions employed during treatment of and polymerization with catalyst component (A).

Oxygen containing compounds containing more than one hydroxyl group are not employed to treat catalyst component (A). While such compounds are quite effective in controlling the molecular weight distribution (MWD) of polymers produced with the catalyst system of the present invention, they have been found to have an adverse effect on catalyst activity.

The oxygen-containing compounds which can be employed to treat catalyst component (A) include alkoxy alcohols, amino alcohols, alkoxy esters, amino esters, hydroxy esters and diesters.

Among the alkoxy alcohols which can be employed are 2-methoxyethanol, 2 ethoxyethanol, 3 methoxybutanol, 3-propoxybutanol, 3 hydroxytetrahydrofuran, and tetrahydrofurfuryl alcohol.

Illustrative of the amino alcohols which can be employed are 1-piperidineethanol, 2-pyrrolidinemethanol, 3 pyrrolidinol, 2-piperidinemethanol, and 1 aziridineethanol.

Suitable alkoxy esters include ethyl-4 anisate, ethyl 2 anisate, ethyl methoxyacetate, and para-ethoxy ethylbenzoate.

Also useful are amino esters such as ethyl 2 dimethylaminobenzoate and methyl 3-(dimethylamino)propionate.

Hydroxy esters which can be employed include methyl 3-hydroxybenzoate, methyl 3 hydroxybutyrate and methyl 2 hydroxycyclohexane carboxylate.

Representative of the diesters which can be employed are dimetyyl phthalate, diethyl phthalate, diisobutyl phthalate, and diisobutyl-cyclobutane 1,2-dicarboxylate.

A solid, particulate, porous, inorganic material is employed as carrier in the preparation of catalyst component (A). The carrier serves as support for the vanadium trihalide/electron donor reaction product, the boron halide or alkylaluminum modifier, and the oxygen containing molecular weight distribution (MWD) regulator. Suitable carriers include inorganic materials, such as oxides of silicon, aluminum and zirconium, as well as phosphates of aluminum. Usually these materials have an average particle size of from about 10 microns to about 250 microns, preferably from about 20 microns to about 150 microns, and a surface area of at least 3 square meters per gram, preferably at least 50 square meters per gram. Polymerization activity of the catalyst, i.e., productivity, can be improved by employing a silica support having an average pore size of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support.

Catalyst component (A) is prepared by treating a solid, particulate, porous, inorganic carrier with:
(1) the reaction product of (a) a vanadium trihalide and (b) an electron donor,
(2) a boron halide or alkylaluminum modifier, and
(3) an oxygen-containing molecular weight distribution (MWD) regulator having the formula A—R—B or R$^1$—B, wherein A, R, B and R1 are as defined above.

The vanadium trihalide/electron donor reaction product is prepared by dissolving at least one vanadium trihalide in at least one electron donor at a temperature of from about 20° C. up to the boiling point of the electron donor. Dissolution of the vanadium trihalide in the electron donor can be facilitated by stirring, and in some instances by refluxing, the vanadium trihalide in the electron donor. Up to several hours of heating may be required to complete dissolution.

After the vanadium trihalide has been dissolved in the electron donor, the reaction product is impregnated into the carrier. Impregnation may be effected by adding the carrier to the solution of the vanadium trihalide in the electron donor, and then drying the mixture to remove excess electron donor. The carrier may be added alone as a dry powder or, if desired, as a slurry in additional electron donor. Ordinarily the carrier and the solution of the vanadium trihalide in the electron donor are mixed together in such amounts that, after drying, the carrier contains from about 0.05 mmoles to about 0.6 mmoles of vanadium per gram, preferably from about 0.3 mmoles to about 0.6 mmoles of vanadium per gram, and most preferably from about 0.3 mmoles to about 0.5 mmoles of vanadium per ram. The impregnated vanadium trihalide/electron donor reaction product prepared in this manner contains from about 1 mole to about 5 moles, preferably from about 2 moles to about 4 moles, and most preferably about 3 moles of electron donor per mole of vanadium trihalide. Excess electron donor not actually complexed with the vanadium trihalide may remain adsorbed on the carrier without ill effects.

The boron halide or alkylaluminum modifier is usually added to the carrier after it has been impregnated with the vanadium trihalide/electron donor reaction product. However, if desired, the boron halide or alkylaluminum modifier may be added to the carrier before it is impregnated with the vanadium trihalide/electron donor reaction product. Addition of the modifier to the carrier may be effected by dissolving one or more modifiers in one or more inert liquid solvents capable of dissolving the modifier, immersing the carrier in the solution, and then drying the mixture to remove the solvent. If the modifier is applied subsequent to the vanadium trihalide/electron donor reaction product, the solvent must be one which does not dissolve the vanadium trihalide/electron donor reaction product.

The carrier may be added to the solution of the modifier alone as a dry powder or, if desired, as a slurry in additional inert liquid solvent. Alternatively, the modifier may be added to a slurry of the carrier in the inert liquid solvent. Usually the modifier is added to the slurry dissolved in additional inert liquid solvent, although this is not necessary. Ordinarily the carrier and the solution of the modifier in the inert liquid solvent are mixed together in such amounts that, after drying, the carrier contains from about 0.1 mole to about 10 moles, preferably from about 0.2 mole to about 2.5 moles, of modifier per mole of electron donor in the vanadium trihalide/electron donor reaction product present in the carrier (or to be added to the carrier if it is applied subsequent to the modifier).

Among the solvents which can be employed to dissolve the boron halide or alkylaluminum modifier are hydrocarbon solvents such as isopentane, hexane, heptane, toluene, xylene and naphtha.

Addition of the oxygen-containing compound to the carrier may be effected in the same manner as addition of the modifier, i.e., by dissolving one or more oxygen-containing compounds in one or more inert liquid solvents capable of dissolving the oxygen-containing compound, immersing the carrier in the solution, and drying the mixture to remove the solvent. If the oxygen containing compound is applied subsequent to the vanadium trihalide/electron donor reaction product, the solvent must be one which does not dissolve the vanadium trihalide/electron donor reaction product. While the oxygen containing compound is usually applied separately, for convenience it may be applied together with the modifier in a single solution, provided that the modifier and oxygen-containing compound employed are not reactive with each other. In any case, the carrier may be added to the solution of the oxygen-containing compound alone as a dry powder or, if desired, as a slurry in additional inert liquid solvent. Alternatively, the oxygen-containing compound may be added to a slurry of the carrier in the inert liquid solvent. Usually the oxygen containing compound is added to the slurry dissolved in additional inert liquid solvent, although this is not necessary.

The amount of oxygen-containing compound employed in the preparation of catalyst component (A) depends upon the particular oxygen-containing compound employed and the molecular weight distribution desired in the polymers to be produced with the treated catalyst. Catalysts of the type employed herein which have not been treated with an oxygen-containing compound have been found to produce polymers having a molecular weight distribution ($M_w/M_n$) in excess of 10 up to about 22. This corresponds to a melt flow ratio (MFR) in excess of 60 up to about 130. By treating such catalysts with the oxygen containing compounds described herein, however, it is possible to lower the melt flow ratio (MFR) of the polymers produced up to as much as 50 percent, depending upon the amount of oxygen-containing compound employed. Reductions of up to 50 percent in melt flow ratio (MFR) usually require a molar ratio of oxygen-containing compound to vanadium trihalide/electron donor reaction product of from about 1:1 to about 15:1, preferably from about 2:1 to about 10:1. Lesser amounts of oxygen containing compound bring about lesser reductions in melt flow ratio (MFR). However, greater amounts of oxygen containing compound have not been found to provide any further reduction in melt flow ratio (MFR). Generally, the oxygen containing compound is employed in amounts such as to provide a molar ratio of oxygen containing compound to vanadium trihalide/electron donor reaction product of from about 0.1:1 to about 30:1, preferably from about 1:1 to about 10:1, depending upon the desired result.

As previously disclosed, it is also possible to regulate the molecular weight of the polymers produced by the use of a suitable chain transfer agent, such as hydrogen, during polymerization. Generally, hydrogen is employed and added to the reactor in an amount sufficient to produce a hydrogen:ethylene mol ratio of from about 0.00001:1 to about 0.5:1, depending upon the melt index desired in the polymer product. In addition to hydrogen, other chain transfer agents may be employed to regulate the molecular weight of the polymers.

The ability to regulate the molecular weight distribution of the polymers over a broad molecular weight range allows polymer properties to be tailored for use in multifarious applications and greatly increases the versatility of the catalyst system.

Component (B) of the catalyst system of the present invention is an alkylaluminum cocatalyst having the formula $$Al(R^6)_3$$

wherein $R^6$ is a saturated hydrocarbon containing from 1 to 14 carbon atoms, which radicals may be the same or different. Such radicals may be substituted with one or more substituents which are inert under the reaction conditions employed during polymerization. Preferably $R^6$ is an alkyl radical containing from 2 to 8 carbon atoms. Triethylaluminum is particularly preferred as improvements in catalyst activity of up to 30 to 70 percent are observed when this particular cocatalyst is employed together with the oxygen containing compound.

Component (C) of the catalyst system of the present invention is a halohydrocarbon polymerization promoter having the formula $$R^7{}_b CX'_{(4-b)}$$

wherein:
 $R^7$ is hydrogen or an unsubstituted or halosubstitued alkyl radical containing from 1 to 6 carbon atoms, which radicals may be the same or different,
 X' is halogen, and
 b is 0, 1 or 2.

Preferred promoters include flouro-, chloro- or bromo substituted ethane or methane having at least 2 halogens attached to a single carbon atom. Preferred promoters include $CCl_4$, $CHCl_3$, $CH_2Cl_2$, $CBr_4$, $CFCl_3$, $CH_3CCl_3$, and $CF_2ClCCl_3$. Particularly preferred promoters are $CH_3CCl_3$, $CFCl_3$, and $CHCl_3$.

Polymerization is effected, with the catalyst system of the present invention by contacting ethylene, or a mixture of ethylene and at least one alpha-olefin having 3 to 8 carbon atoms, with the three components of the catalyst system, i.e., the solid catalyst precursor (treated with the oxygen-containing compound), the alkylaluminum cocatalyst, and the halohydrocarbon polymerization promoter. While polymerization can be effected employing either solution, slurry or gas phase techniques, it is preferably effected in a fluid bed reaction system. Suitable fluid bed reaction systems are described, e.g., in U.S. Pat. No. 4,302,565, 4,302,566 and 4,303,771, the disclosures of which are incorporated herein by reference.

The solid catalyst precursor, cocatalyst and polymerization promoter can be introduced into the polymerization reactor through separate feed lines or, if desired, two or all of the components may be partially or completely mixed with each other before they are introduced into the reactor. In any event, the cocatalyst and polymerization promoter are employed in such amounts as to provide a molar ratio of the promoter to the alkyl-aluminum cocatalyst of from about 0.1:1 to about 10:1, preferably from about 0 2:1 to about 2:1, and the cocatalyst and the solid catalyst precursor are employed in such amounts as to provide an atomic ratio of aluminum in the cocatalyst to vanadium in the precursor of from about 10:1 to about 400:1, preferably from about 15:1 to about 60:1.

Both the cocatalyst and the polymerization promoter may be introduced into the reactor dissolved in an inert liquid solvent, i.e., a solvent which is nonreactive with all the components of the catalyst system as well as all the components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the polymerization promoter. If desired, less concentrated or more concentrated solutions can be employed, or, alternatively, the cocatalyst and polymerization promoter can be added in the absence of solvent, or, if desired, suspended in a stream of liquified monomer. When a solvent is employed and polymerization is conducted in a fluid bed, the amount of solvent introduced into the reactor should be carefully controlled so as to avoid the use of excessive quantities of liquid which would interfere with the operation of the fluidized bed.

The solvents employed to dissolve the cocatalyst and the polymerization promoter may also be employed to introduce the solid catalyst precursor into the reactor. Higher boiling solvents, such as mineral oil, are preferred for this purpose. While the solid catalyst precursor may also be introduced into the reactor in the absence of solvent or suspended in liquified monomer, such solvents may be employed to disperse the solid catalyst precursor and facilitate its flow into the reactor. Such dispersions generally contain from 1 weight percent to 75 weight percent of the solid precursor.

The alpha-olefins which may be polymerized with ethylene contain from 3 to 8 carbon atoms per molecule. These alpha olefins should not contain any branching or any of their atoms closer than two carbon atoms removed from the double bond. Suitable alpha olefins include propylene, butene-1, pentene-1, hexene-1, 4 methyl-pentene-1, heptene-1 and octene 1.

The temperature employed can vary from about 10° C. to about 115° C., preferably from about 80° C. to about 110° C., when polymerization is effected in gas phase or in a slurry, and from about 150° C. to about 250° C. when polymerization is effected in a solution. When polymerization is conducted in a fluid bed, the temperature, of course, must be maintained below the sintering temperature of the polymers produced in order to prevent polymer agglomeration.

The pressure employed can vary from subatmosphere to superatmosphere. Pressures of up to about 7000 kPa, preferably of from about 70 kPa to about 3500 kPa, are suitable for gas phase, slurry and solution polymerizations.

If desired, polymerization may be conducted in the presence of an inert gas, i.e., a gas which is nonreactive under the conditions employed during polymerization. The reactor should, however, be maintained substantially free of undesirable catalyst poisons, such as moisture, oxygen, carbon monoxide, carbon dioxide, acetylene, and the like.

When polymerization is conducted in a fluid bed, the superficial gas velocity of the gaseous reaction mixture through the bed must exceed the minimum flow required for fluidization in order to maintain a viable fluidized bed. The following Examples are designed to illustrate the process of the present invention and are not intended as a limitation upon the scope thereof.

The properties of the polymers produced in the Examples were determined by the following test methods:

Density

A plague is made and conditioned for one hour at 120° C. to approach equilibrium crystallinity and is then quickly cooled to room temperature. Measurement for density is then made in a density radient column, and density values are reported as grams/cm$^3$.

Melt Index (MI)

ASTM D 1238, Condition E. Measured at 190° C. and reported as grams per 10 minutes,

Flow Index (FI)

ASTM D 1238, Condition F. Measured at 10 times the weight used in the melt index text above.

Melt Flow Ratio (MFR)

Ratio of Flow Index: Melt Index.

Productivity

A sample of the resin product is ashed, and the weight percent of ash is determined. Since the ash is essentially composed of the catalyst, the productivity is thus the kilograms of polymer produced per kilogram of total catalyst consumed.

Activity

Activity values are normalized values based upon grams of polymer produced per mmol of vanadium in the catalyst per hour per 100 psi of ethylene polymerization pressure.

EXAMPLE 1

Impregnation of Carrier with VCl$_3$/THF Reaction Product

To a flask equipped with a mechanical stirrer were added 4 liters of anhydrous tetrahydrofuran (THF), followed by 50 grams (0.318 mole) of solid VCl$_3$. The mixture was heated under nitrogen at a temperature of 65° C. for 5 hours with continuous stirring in order to completely dissolve the VCl3.

Eight hundred grams (800 g) of silica gel were dehydrated by heating under nitrogen at a temperature of 600° C. for 20 hours. The dehydrated gel was added to the solution prepared as above, and the mixture was refluxed for one hour under nitrogen. At the end of this time, the mixture was heated at a temperature of 55° C. for about 6 hours under a purge of dry nitrogen to produce a dry, free-flowing powder containing about 8 weight percent THF.

EXAMPLE 2

Treatment of Carrier with Diethylaluminum Chloride

Five hundred grams (500 g) of the silica carrier impregnated with VCl3/THF reaction product in accordance with Example 1 were slurried in 4 liters of anhydrous hexane. The slurry was continuously stirred while a 10 weight percent solution of diethylaluminum chloride in anhydrous hexane was added over a period of 30 minutes. The impregnated carrier and the diethylaluminum chloride solution were employed in amounts that provided a desired atomic ratio of aluminum to vanadium. After addition of the diethylaluminum chloride solution was complete, the mixture was heated at a temperature of 45° C. for about 6 hours under a purge of dry nitrogen to produce a dry, free flowing powder.

EXAMPLE 3

Treatment of Carrier with MWD Regulator

Five grams (5.0 g) of the silica carrier treated with diethylaluminum chloride in accordance with Example 2 were slurried in 30 ml of anhydrous hexane. The slurry was continuously stirred while a one molar solution of an oxygen-containing molecular weight distribution (MWD) regulator in anhydrous hexane was added over a period of 5 minutes. After addition of the solution was complete, the mixture was stirred for an additional 30–60 minutes. At the end of this time, the mixture was heated at a temperature of 50° C. either under vacuum or under a purge of dry nitrogen to remove the hexane diluent and produce a free flowing powder.

The procedure was repeated a number of times with various oxygen containing MWD regulators.

Table I below sets forth the particular oxygen containing MWD regulators employed in each of these experiments, as well as the molar ratio of MWD regulator to vanadium present in the treated carrier.

TABLE I

| Example 3 | MWD Regulator | Mol. Ratio MWD Regulator to V in Treated Carrier |
|---|---|---|
| (a) | 2-methoxyethanol | 3.5 |
| (b) | 2-ethoxyethanol | 4.6 |
| (c) | 3-methoxybutanol | 3.5 |
| (d) | 3-hydroxytetrahydrofuran | 4.6 |
| (e) | 1-piperidineethanol | 3.4 |
| (f) | ethyl 4-anisate | 6.6 |
| (g) | ethyl 2-anisate | 1.1 |
| (h) | ethyl methoxyacetate | 4.0 |
| (i) | diethyl phthalate | 3.5 |
| (j) | diisobutyl phthalate | 2.5 |

EXAMPLES 4–13

Slurry Polymerization

The solid catalyst components prepared as described in Example 3 were employed together with an alkylaluminum compound (triethylaluminum), as cocatalyst, and a halohydrocarbon compound ($CHCl_3$ or $CFCl_3$) as polymerization promoter, to co polymerize ethylene and hexene 1 in a one liter autoclave reactor.

In each polymerization, the three catalyst components were pre mixed in a 6 ounce bottle containing 100 ml of hexane before being added to the reactor. Twenty milliliters (20.0 ml) of hexene-1 were added to the pre mixed catalyst components before the resulting mixture was transferred to the reactor. Anhydrous conditions were maintained at all times.

The polymerization reactor was dried by heating at 96° C. under a stream of dry nitrogen for 40 minutes. After cooling the reactor to 50° C., 500 ml of hexane were added to the reactor, and the reactor contents were stirred under a gentle flow of nitrogen. The premixed catalyst components were then transferred to the reactor under a stream of nitrogen and the reactor was sealed. The temperature of the reactor was gradually raised to 60° C. and the reactor was pressurized with hydrogen to a pressure of 10 kpa. The temperature was then raised to 75° C. and the reactor was pressurized to 1050 kPa with ethylene. Heating was continued until the desired polymerization temperature of 85° C. was attained. Polymerization was allowed to continue for 30 minutes, during which time ethylene was continually added to the reactor to maintain the pressure constant. At the end of 30 minutes, the reactor was vented and opened.

Table III below set forth the details involving the composition of the catalysts employed in these polymerizations, as well as the reaction conditions employed during polymerization, the properties of the polymers produced, and the productivity of each catalyst system.

Shorthand designations employed in Table III are defined as follows:

| Designation | Definition |
|---|---|
| THF | Tetrahydrofuran |
| DEAC | Diethylaluminum chloride |
| TEAL | Triethylaluminum |

COMPARATIVE EXAMPLE A

For comparative purposes, ethylene was polymerized as in Examples 4–13 employing the solid catalyst component prepared in accordance with Example 2, i.e., the catalyst component employed had not been treated with the MWD regulator as in Example 3. The details of this polymerization are set forth in Table III below along with the details of Examples 4–13.

COMPARATIVE EXAMPLES B–E

For comparative purposes, ethylene was polymerized as in Examples 4–13 except that the solid catalyst component employed was treated with the oxygen containing compounds set forth in Table II below.

TABLE II

| Comparative Example | Oxygen-Containing Compound |
|---|---|
| B | (k) ethylene glycol |
| C | (l) 1,2-dimethoxyethane |
| D | (m) 1-butanol |
| E | (n) 2,2,2-trichloroethanol |

The details of these polymerizations are set forth in Table III below along with the details of Examples 4–13 and Comparative Example A. It is apparent from the Comparative Examples that diols and diethers have an adverse affect on catalyst activity while monofunctional alcohols provide little improvement in MFR.

TABLE III

| EXAMPLE | 4 | 5 | 6 | 7 | 8 | 9 | 10 | 11 |
|---|---|---|---|---|---|---|---|---|
| Catalyst | | | | | | | | |
| Carrier | $SiO_2$ | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC | DEAC | DEAC |
| Modifier/V Ratio | 1.1 | 1.1 | 1.1 | 1.1 | 1.1 | 1.1 | 1.1 | 1.1 |
| MWD Regulator* | (a) | (b) | (c) | (d) | (e) | (f) | (g) | (h) |
| MWD Regulator/V Ratio | 3.5 | 4.6 | 3.5 | 4.6 | 3.4 | 6.6 | 1.1 | 4.0 |
| Cocatalyst | TEAL | TEAL | TEAL | TEAL | TEAL | TEAL | TEAL | TEAL |
| Al/V Ratio | 40 | 40 | 40 | 40 | 40 | 40 | 40 | 40 |
| Promoter | $CHCl_3$ | $CHCl_3$ | $CFCl_3$ | $CHCl_3$ | $CFCl_3$ | $CHCl_3$ | $CHCl_3$ | $CFCl_3$ |
| Promoter/Al Ratio | 1.0 | 1.0 | 1.0 | 1.0 | 1.0 | 1.0 | 1.0 | 1.0 |
| Reaction Conditions | | | | | | | | |
| Temperature, °C | 85 | 85 | 85 | 85 | 85 | 85 | 85 | 85 |
| Pressure, kPa | 1050 | 1050 | 1050 | 1050 | 1050 | 1050 | 1050 | 1050 |
| Reaction Time, minutes | 30 | 30 | 30 | 30 | 30 | 30 | 30 | 30 |
| Polymer Properties | | | | | | | | |
| Density, g/cm$^3$ | 0.942 | 0.945 | 0.945 | 0.947 | 0.943 | 0.949 | 0.951 | 0.947 |
| Melt Index, g/10 min. | 0.92 | 15 | 1.7 | 2.6 | 15 | 1.1 | 0.91 | 1.8 |
| Flow Index, g/10 min. | 43 | 568 | 76 | 126 | 512 | 74 | 47 | 80 |
| Melt Flow Ratio | 47 | 38 | 44 | 48 | 34 | 69 | 52 | 45 |
| Activity | | | | | | | | |
| g polymer/mmol V-Hr-100 psi $C_2H_4$ | 1289 | 1344 | 1282 | 941 | 1074 | 1191 | 839 | 1206 |

| EXAMPLE | 12 | 13 | Comp. Exp. A | Comp. Exp. B | Comp. Exp. C | Comp. Exp. D | Comp. Exp. E |
|---|---|---|---|---|---|---|---|
| Catalyst | | | | | | | |
| Carrier | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC | DEAC |
| Modifier/V Ratio | 1.1 | 1.1 | 1.1 | 1.1 | 1.1 | 1.1 | 1.1 |
| MWD Regulator* | (i) | (j) | — | (k) | (l) | (m) | (n) |
| MWD Regulator/V Ratio | 3.5 | 2.5 | — | 4.0 | 4.0 | 4.4 | 4.6 |
| Cocatalyst | TEAL | TEAL | TEAL | TEAL | TEAL | TEAL | TEAL |
| Al/V Ratio | 40 | 40 | 40 | 40 | 40 | 40 | 40 |
| Promoter | $CFCl_3$ | $CFCl_3$ | $CFCl_3$ | $CHCl_3$ | $CHCl_3$ | $CHCl_3$ | $CHCl_3$ |
| Promoter/Al Ratio | 1.0 | 1.0 | 1.0 | 1.0 | 1.0 | 1.0 | 1.0 |
| Reaction Conditions | | | | | | | |
| Temperature, °C | 85 | 85 | 85 | 85 | 85 | 85 | 85 |
| Pressure, kPa | 1050 | 1050 | 1050 | 1050 | 1050 | 1050 | 1050 |
| Reaction Time, minutes | 30 | 30 | 30 | 30 | 30 | 30 | 30 |
| Polymer Properties | | | | | | | |
| Density, g/cm$^3$ | 0.948 | 0.945 | 0.952 | 0.951 | — | 0.944 | 0.944 |
| Melt Index, g/10 min. | 3.4 | 4.8 | 1.2 | 37 | — | 2.7 | 7.8 |
| Flow Index, g/10 min. | 174 | 213 | 89 | 673 | — | 188 | 512 |
| Melt Flow Ratio | 51 | 44 | 75 | 18 | — | 69 | 66 |
| Activity | | | | | | | |
| g polymer/mmol V-Hr-100 psi $C_2H_4$ | 1344 | 1416 | 820 | 371 | <100 | 795 | 815 |

*The MWD Regulators employed in these Examples are set forth in Table I and II, supra.

EXAMPLES 14–15

Gas Phase Polymerization

The solid catalyst components prepared as described in Examples 3(a) and 3(f) were employed together with an alkylaluminum compound (triethylaluminum), as cocatalyst, and a halohydrocarbon compound ($CFCl_3$), as polymerization promoter, to copolymerize ethylene and hexene-1 in a fluid bed reactor system similar to that described and illustrated in U.S. Pat. Nos. 4,302,565, 4,302,566 and 4,303,771.

In each polymerization, the solid catalyst component was continually fed to the polymerization reactor along with the triethylaluminum cocatalyst, as a 5 percent solution in isopentane, and the $CFCl_3$ polymerization promoter, also as a 5 percent solution in isopentane.

Hydrogen was added to the reactor as a chain transfer agent to regulate the molecular weight of the polymer produced. A small amount of nitrogen was also present.

Table IV below sets forth the details involving the composition of the catalysts employed in these polymerizations, as well as the reaction conditions employed during polymerization, the properties of the polymers produced, and the productivity of each catalyst system.

Shorthand designations employed in Table IV are the same as those employed in Table III.

COMPARATIVE EXAMPLE F

For comparative purposes, ethylene was copolymerized with hexene-1 as in Examples 14–15 employing the solid catalyst component prepared in accordance with Example 2, i.e., the catalyst component employed had not been treated with the MWD regulator as in Example 3. The details of this polymerization are set forth in Table IV below along with the details of Examples 14–15.

TABLE IV

| EXAMPLE | 14 | 15 | Comp. Exp. F |
|---|---|---|---|
| Catalyst | | | |
| Carrier | $SiO_2$ | $SiO_2$ | $SiO_2$ |
| Precursor | $VCl_3$/THF | $VCl_3$/THF | $VCl_3$/THF |
| Modifier | DEAC | DEAC | DEAC |
| Modifier/V Ratio | 1.6 | 1.2 | 1.2 |

TABLE IV-continued

| EXAMPLE | 14 | 15 | Comp. Exp. F |
|---|---|---|---|
| MWD Regulator* | (c) | (f) | — |
| MWD Regulator/V Ratio | 3.5 | 4.7 | — |
| Cocatalyst | TEAL | TEAL | TEAL |
| Al/V Ratio | 60 | 40 | 45 |
| Promoter | $CFCl_3$ | $CFCl_3$ | $CFCl_3$ |
| Promoter/Al Ratio | 0.83 | 1.0 | 1.1 |
| Reactions Conditions | | | |
| Temperature, °C. | 95 | 85 | 85 |
| Total Pressure, kPa | 2205 | 2205 | 2205 |
| Ethylene Partial Pressure, kPa | 1488 | 1610 | 1610 |
| Nitrogen Partial Pressure, kPa | 683 | 527 | 503 |
| Hydrogen Partial Pressure, KPa | 34 | 68 | 92 |
| Comonomer | Hexene-1 | Hexene-1 | Hexene-1 |
| Comonomer/Ethylene Mol Ratio | 0.0058 | 0.0070 | 0.0075 |
| Hydrogen/Ethylene Mol Ratio | 0.023 | 0.042 | 0.057 |
| Residence Time, hours | 5 | 4 | 5 |
| Polymer Properties | | | |
| Density, g/cm³ | 0.951 | 0.953 | 0.952 |
| Melt Index, g/10 min. | 0.47 | 0.37 | 0.24 |
| Flow Index, g/10 min. | 29 | 34 | 30 |
| Melt Flow Ratio | 61 | 92 | 122 |
| Productivity | | | |
| Ash, wt % | 0.056 | 0.069 | 0.078 |

*The MWD Regulators employed in these Examples are set forth in Table I, supra.

EXAMPLES 16–20

Effect of Concentration of MWD Regulator on MFR

For comparative purposes, ethylene was copolymerized with hexene-1 as in Example 14 except that the amount of 3 methoxybutanol employed as MWD regulator was varied to illustrate how molecular weight distribution is affected by varying the concentration of this material. All polymerizations in these examples were conducted at 85° C. except Example 19 which was conducted at 95° C.

The molar ratio of the MWD regulator to vanadium employed in each of these examples as well as the properties of the polymer obtained in each example is set forth in Table V below.

Comparative Example F is included to illustrate the results obtained with the untreated catalyst.

TABLE V

| | Comp. Exp. F | 16 | 17 | 18 | 19 | 20 |
|---|---|---|---|---|---|---|
| MWD Regulator/V Ratio | 0 | 0.3 | 1.2 | 2.0 | 3.5 | 5.0 |
| Melt Index, g/10 min | 0.24 | 0.28 | 0.31 | 0.47 | 0.47 | 0.58 |
| Flow Index, g/10 min | 30 | 33 | 30 | 33 | 29 | 32 |
| Melt Flow Ratio | 122 | 117 | 97 | 70 | 61 | 55 |

We claim:

1. A solid catalyst precursor consisting essentially of:
   (1) a solid, particulate, porous, inorganic carrier, as support for
   (2) the reaction product of (a) a vanadium trihalide and (b) an electron donor,
   (3) a boron halide or alkylaluminum modifier, and
   (4) an oxygen containing molecular weight distribution regulator selected from the group consisting of compounds having the formulas $A-R-B$ and $R^l-B$ wherein:

R is a divalent hydrocarbon radical free of aliphatic unsaturation containing from 1 to 14 carbon atoms,
   $R^1$ is a heterocyclic ring free of aliphatic unsaturation containing from 2 to 14 carbon atoms and at least one oxygen or nitrogen atom, and
   A and B are each selected from the group consisting of:

$-OH$, $R^l$, $-OR^2$, $-COOR^2$, and $-NR^3R^4$ wherein:

$R^1$ is as defined above,
   $R^2$ is a monovalent hydrocarbon radical free of aliphatic unsaturation containing from 1 to 14 carbon atoms, and
   $R^3$ and $R^4$ are individually hydrogen or monovalent hydrocarbon radicals free of aliphatic unsaturation containing from 1 to 14 carbon atoms,
   with the proviso that at least one of A and B must be $-OH$ or $-COOR^2$, but both A and B cannot be $-OH$.

2. A solid catalyst precursor as in claim 1 wherein:
   R is an alkylene radical containing from 1 to 6 carbon atoms or an arylene radical containing 6 carbon atoms,
   $R^l$ is a heterocyclic ring which contains from 2 to 6 carbon atoms and one oxygen or one nitrogen atom, and
   $R^2$, $R^3$ and $R^4$ are alkyl radicals containing from 1 to 6 carbon atoms, or aryl radicals containing 6 carbon atoms.

3. A solid catalyst precursor as in claim 2 wherein the oxygen containing molecular weight distribution regulator is an alkoxy alcohol.

4. A solid catalyst precursor as in claim 3 wherein the oxygen-containing molecular weight distribution regulator is 2-methoxyethanol.

5. A solid catalyst precursor as in claim 3 wherein the oxygen-containing molecular weight distribution regulator is 2-ethoxyethanol.

6. A solid catalyst precursor as in claim 3 wherein the oxygen containing molecular weight distribution regulator is 3-methoxybutanol.

7. A solid catalyst precursor as in claim 3 wherein the oxygen-containing molecular weight distribution regulator is 3-hydroxytetrahydrofuran.

8. A solid catalyst precursor as in claim 2 wherein the oxygen containing molecular weight distribution regulator is an amino alcohol.

9. A solid catalyst precursor as in claim 8 wherein the oxygen containing molecular weight distribution regulator is 1-piperidineethanol.

10. A solid catalyst precursor as in claim 2 wherein the oxygen containing molecular weight distribution regulator is an alkoxy ester.

11. A solid catalyst precursor as in claim 10 wherein the oxygen containing molecular weight distribution regulator is ethyl 4-anisate.

12. A solid catalyst precursor as in claim 10 wherein the oxygen containing molecular weight distribution regulator is ethyl 2-anisate.

13. A solid catalyst precursor as in claim 10 wherein the oxygen containing molecular weight distribution regulator is ethyl methoxyacetate.

14. A solid catalyst precursor as in claim 2 wherein the oxygen containing molecular weight distribution regulator is an amino ester.

15. A solid catalyst precursor as in claim 2 wherein the oxygen containing molecular weight distribution regulator is an hydroxy ester.

16. A solid catalyst precursor as in claim 2 wherein the oxygen-containing molecular weight distribution regulator is a diester.

17. A solid catalyst precursor as in claim 16 wherein the oxygen containing molecular weight distribution regulator is diethyl phthalate.

18. A solid catalyst precursor as in claim 16 wherein the oxygen-containing molecular weight distribution regulator is diisobutyl phthalate.

19. A catalyst system comprising:
(A) the solid catalyst precursor of claim 1,
(B) an alkylaluminum cocatalyst having the formula $$Al(R^6)_3$$

wherein:
$R^6$ is a saturated hydrocarbon radical containing from 1 to 14 carbon atoms,
(C) a halohydrocarbon polymerization promoter having the formula $$(R^7)_b CX'^{(4-b)}$$

wherein:
$R^7$ is hydrogen or an unsubstituted or halosubstituted alkyl radical containing from 1 to 6 carbon atoms,
$X'$ is halogen, and
b is 0, 1 or 2.

20. In a catalyst system comprising
(A) a solid catalyst precursor consisting essentially of
(1) a solid, particulate, porous, inorganic carrier, as support for
(2) the reaction product of (a) a vanadium trihalide and (b) an electron donor, and
(3) a boron halide or alkylaluminum modifier,
(B) an alkylaluminum cocatalyst, and
(C) a halohydrocarbon polymerization promoter,
the improvement wherein the solid catalyst precursor (A) is treated with an oxygen containing molecular ht distribution regulator selected from the group consisting of compounds having the formulas $$A—R—B \text{ and } R^1—B$$

wherein:
R is a divalent hydrocarbon radical free of aliphatic unsaturation containing from 1 to 14 carbon atoms,
$R^1$ is a heterocyclic ring free of aliphatic unsaturation containing from 2 to 14 carbon atoms and at least one oxygen or nitrogen atom, and
A and B are each selected from the group consisting of:

$$—OH, —R^1, —OR^2, —COOR^2, \text{ and } —NR^3R^4$$

wherein:
$R^1$ is as defined above,
$R^2$ is a monovalent hydrocarbon radical free of aliphatic unsaturation containing from 1 to 14 carbon atoms and
$R^3$ and $R^4$ are individually hydrogen or monovalent hydrocarbon radicals free of aliphatic unsaturation containing from 1 to 14 carbon atoms,
with the proviso that at least one of A and B must be —OH or —COOR², but both A and B cannot be —OH.

* * * * *